Figure 1:
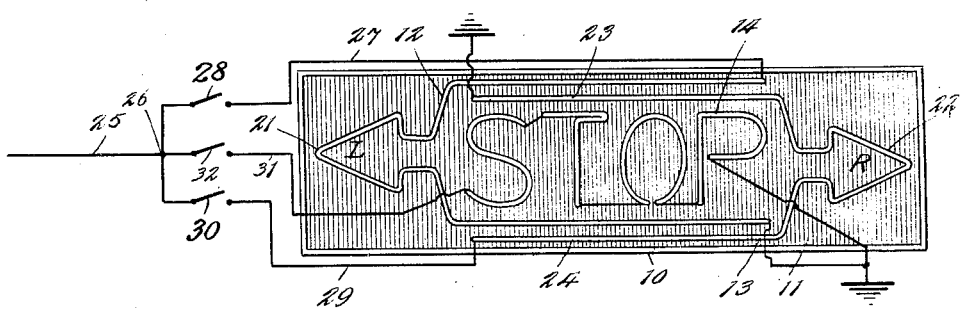

Feb. 17, 1931.                H. J. MURRAY                1,792,599
                    NEON LIGHT DIRECTION SIGNAL
                        Filed April 11, 1929

INVENTOR
HOWARD J. MURRAY
BY
Warren S. Orton
ATTORNEY

Patented Feb. 17, 1931

1,792,599

UNITED STATES PATENT OFFICE

HOWARD J. MURRAY, OF NEW YORK, N. Y., ASSIGNOR TO R. M. COMPANY, INC., OF EAST PITTSBURGH, PENNSYLVANIA, A CORPORATION OF DELAWARE

NEON-LIGHT DIRECTION SIGNAL

Application filed April 11, 1929. Serial No. 354,432.

The invention relates in general to automotive vehicle signalling devices, and relates specifically to such devices used to indicate the turning of the vehicle on which it is mounted, or the intent of the operator to turn to the right or left, generally known as direction indicating devices.

The invention features the use of luminescent tubes containing gases such as neon, helium, and the like, in which an electric discharge from a source of high tension electric current passes through the gases in the tubes and this causes them to become luminous. Direction signals now in common use on vehicles are usually in the form of a series of lights arranged in the form of a pair of arrows, or separate signals in the form of arrows horizontally disposed and pointing in opposite directions. There has also been suggested heretofore the providing of a signal in the form of a two headed arrow having a common stem which comprises three electric circuits with a complicated system of electric contacts arranged to illuminate the common stem and selectively illuminate one of the heads depending upon the direction which is to be indicated. There is an objection to the presence on automotive vehicles to complicated electric wiring systems with their incidental multiplicity of contact points, and for this reason the double headed arrow form of direction signaling devices have not proven satisfactory.

Neon tubes have certain advantages in signal devices, such, for instance, as long life and low consumption of electric energy, but they have the disadvantage of providing only a low light intensity, and if employed under usual service conditions as a rear light on a fast travelling vehicle, they are apt to show simply as a splotch of light in foggy or rainy weather, and are not sufficiently distinct so as to be visible to the driver of a car in rear unless the arrow or equivalent signal is sufficiently large to have its direction characteristics clearly visible. There is a practical objection to the use of long signalling casings on automobiles, the whole tendency at present being to confine signalling devices to the smallest possible space.

The primary object of this invention is to provide a commercially practicable direction signalling device which can employ neon and like luminous gas containing tubes, in order to obtain the advantages of such tubes; which will clearly indicate the intended direction of turn of the vehicle under road conditions not favorable to visibility, and which at the same time can be contained in a small casing which will need only a slight increase in length over a known form of stop signal device, and which will thus meet the commercial requirement for a small, compact direction signal device.

Broadly, this object of the invention is attained simply by using two elongated neon tubes of arrow shapes and with the stem portion of one vertically overlapping the stem portion of the other, thus containing two relatively long arrows in a space, horizontally considered, not materially longer than the sum of the length of the head of the two arrows, plus the length of one stem.

Other and incidental objects of the invention are, to provide a combined direction and stop signal device in which the right and left direction signals are combined with a "stop" or other signal indication in such way that the three signals can be compactly arranged and at the same time give the requisite length to the arrows so that they will be distinctly visible as such when used under service conditions.

This phase of the invention is obtained by splitting the stem of the arrows and arranging them in vertically spaced relation and thus provide a boxed space therebetween to accommodate the "stop" or other signal utilized with the direction indicator herein featured.

Various other objects and advantages of the invention will be in part obvious from an inspection of the acompanying drawings and in part will be more fully set forth in the following particular description of two forms of mechanism embodying my invention, and the invention also consists in certain new and novel features of construction and combination of parts hereinafter set forth and claimed.

Figure 2:
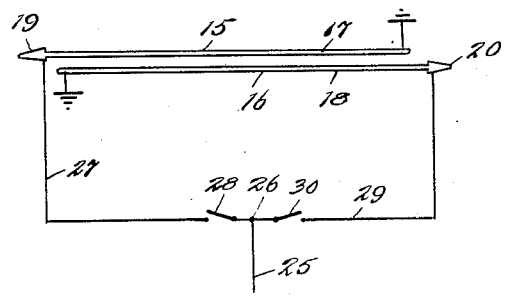

In the drawings:

Fig. 1 is a view in front elevation of a signalling device constituting a preferred embodiment of the invention featuring a three signal form of construction, and shown with its incidental wiring diagram, and Fig. 2 is a similar view of a simpler embodiment of the invention featuring solely the direction indicating feature.

In the drawings, and referring first to the disclosure in Fig. 1, there is shown a casing 10 preferably in the form of an open front box, the bottom 11 of which is painted black to provide a dark background for the energized tubes, as hereinafter described. It is intended that the casing be mounted conventionally on an automotive vehicle, but it is obviously within the scope of this disclosure to mount the tubes directly on some vehicle part, conventionally fastening the tubes in place as is usual in the mounting of neon sign tubes now in general use. Within the casing 10 are mounted three tubes 12, 13 and 14, of the type generally known as luminescent gas containing tubes, and in the instant case being clear glass tubing containing neon gas, and capable of giving the color characterizing the light from such tubes. Two of the tubes 12 and 13 are molded into the form of arrows of the same dimensions and configurations but pointing in opposite horizontal directions and in substantial horizontal alignment.

In the form of the invention shown in Fig. 2, the arrow shaped tubes 15 and 16 are simply straight tubes for the major portion of their length, with their stem portions 17 and 18 disposed parallel to each other in vertically superposed and overlapping relation and with their respective heads 19 and 20 projecting beyond and disposed in laterally offset relation to the adjacent end of the other tube.

In the form of the invention shown in Fig. 1, the tubes are formed by bending them intermediate their ends to form pointed arrow heads 21 and 22 with the bifurcated stem portions 23 and 24 of each arrow extended parallel to each other and vertically spaced apart to provide a framed space to accommodate the third tube 14 hereinafter described. It is apparent that the necessary space, considered horizontally, to contain the two long arrows, in either form of the invention, is not materially greater than the distance equal to the sum of the length of the two heads plus the length of one of the stems. In this way there is effected a saving in width of the signal as a whole, equal to the length of one of the arrow stems.

The arrangement of the bent or what may be called hollow arrows in the showing in Fig. 1 was illustrated to show the adaptability of tubes of the character under discussion to form direction signals of more complicated forms than the straight arrows shown in Fig. 2, and it is obviously within the scope of the disclosure to form the direction signal in other forms, such as in the form of pointing hands.

The hollow arrow construction shown in Fig. 1 forms a frame for outlining the space containing the signal 14. In this case the third signal character is formed into the word "stop". The signal 14 is likewise formed of one or more neon tubes, and in general this part of this disclosure follows a known structure.

The three tubes or signals herein disclosed are supplied from a source of high tension electric energy indicated symbolically by the lead 25 which connects with a branch block 26. From the branch block one conductor 27 leads to the left direction indicating arrow 12 or 15 and contains a left turn switch 28 of either the manually actuated or mechanically actuated type now in general use. Similarly, a conductor 29 leads through a right turn control switch 30 to the right direction indicating arrow 13 or 16 as the case may be. Similarly, in the case of the showing in Fig. 1, a third conductor 31 leads through a "stop" switch 32 to the stop indicating signal 14. It is understood that in each instance the circuit containing one of the neon tubes is conventionally grounded.

As a matter of convenience, it is suggested that the switches 28, 30 and 32 be mounted at some point on the vehicle, such for instance as on the steering wheel, so as to be convenient to the operator of the vehicle as is known in similar forms of controls for direction indicating signalling devices.

It is appreciated that the circuit arrangement herein suggested is of the simplest possible type, there being but one break in the circuit, that is the break necessary to provide the controlling switch or equivalent circuit breaker. The circuit for supplying each tube is complete in itself and there has been avoided the objections inherent in the complicated wiring necessary in prior structures employing double headed arrows.

By means of a device of the character herein disclosed, it is possible to utilize neon tubes with all the advantages inherent in the use of such tubes and the disadvantage of the relatively low light emitting power of such tubes has been compensated for by the use of relatively long tubes. As shown in the device illustrated in Fig. 1, the double tube outlining an arrow tends to increase the light emitting area and emphasizes the arrow outline so that the indicated direction of turn is clearly visible to the operator of a following car, and this form of signal becomes peculiarly emphatic in its attention attracting characteristics when the signal is intermittently flashed as by turning the controlling switch off and on in rapid sequence. The presence of an inactive tube in juxtaposition to an active tube has a tendency to brighten the entire area by reflected light without imposing its own direction indicating features for the illuminated tube is strongly presented to view where there is a dark or otherwise contrasting background.

I claim:

In a vehicle signaling device the combination of a casing providing a dark background, three independent luminescent tubes disposed in advance of said background and, when energized, contrasting vividly with the background, two of said tubes being in the form of arrows pointing in the opposite direction and with the stem part of each arrow comprising two parallel vertically spaced apart portions, these parallel portions of the two arrow shaped tubes being in mutually overlapped relation, considered vertically, and the third tube shaped to indicate a signal when energized and contained within the space outlined at top and bottom by the two arrow shaped tubes and illuminated by either of said arrow tubes when illuminated.

Signed at Detroit in the county of Wayne and State of Michigan this 5th day of April, A. D. 1929.

HOWARD J. MURRAY.